(12) United States Patent
Black-Ziegelbein et al.

(10) Patent No.: US 8,825,834 B2
(45) Date of Patent: Sep. 2, 2014

(54) AUTOMATED CLUSTER MEMBER MANAGEMENT BASED ON NODE CAPABILITIES

(75) Inventors: Elizabeth A. Black-Ziegelbein, Iowa City, IA (US); Tsu-Phin Hee, Morrisville, NC (US); Brian K. Martin, Cary, NC (US); Michael J. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1775 days.

(21) Appl. No.: 11/949,172

(22) Filed: Dec. 3, 2007

(65) Prior Publication Data

US 2009/0144800 A1   Jun. 4, 2009

(51) Int. Cl.
| | |
|---|---|
| *G06F 15/177* | (2006.01) |
| *G06F 15/173* | (2006.01) |
| *G06F 17/30* | (2006.01) |
| *G06F 9/50* | (2006.01) |
| *H04L 29/08* | (2006.01) |
| *G06F 11/14* | (2006.01) |

(52) U.S. Cl.
CPC ........ *G06F 17/30362* (2013.01); *G06F 9/5061* (2013.01); *H04L 69/329* (2013.01); *G06F 11/142* (2013.01)
USPC ............ 709/224; 709/220; 709/221; 709/223

(58) Field of Classification Search
CPC ............ G06F 17/30362; G06F 9/5061; G06F 11/142; H04L 69/329
USPC ................................. 709/220, 221, 223, 224
See application file for complete search history.

(56) References Cited

U.S. PATENT DOCUMENTS

| | | | | |
|---|---|---|---|---|
| 6,453,426 | B1 * | 9/2002 | Gamache et al. | 714/4 |
| 7,039,694 | B2 * | 5/2006 | Kampe et al. | 709/222 |
| 2006/0037016 | A1 * | 2/2006 | Saha et al. | 717/178 |
| 2007/0219933 | A1 * | 9/2007 | Datig | 706/4 |
| 2008/0281954 | A1 * | 11/2008 | Bagal | 709/223 |
| 2009/0119655 | A1 * | 5/2009 | Quilty | 717/168 |

OTHER PUBLICATIONS

Rymer, John R., The Muddle in the Middle, Byte.com, 2005.

* cited by examiner

*Primary Examiner* — Hieu Hoang
(74) *Attorney, Agent, or Firm* — Steven M. Greenberg, Esq.; CRGO Law

(57) ABSTRACT

Embodiments of the present invention provide a method, system and computer program product for automated cluster member management based on node capabilities. In one embodiment of the invention, a method for automated cluster member management based on node capabilities can be provided. The method can include defining a membership policy for a cluster, the membership policy specifying a nodal configuration required for a node in a cluster. The method further can include evaluating different nodes in a computing environment against the membership policy for the cluster. Finally, the method can include associating cluster members in the cluster to only those of the nodes having respective configurations meeting the nodal configuration of the membership policy. Likewise, the method can include evaluating nodes already in the cluster, and disassociating cluster members in the cluster from those of the nodes having respective configurations failing to meet the nodal configuration of the membership policy.

16 Claims, 2 Drawing Sheets

AUTOMATED CLUSTER MEMBER MANAGEMENT BASED ON NODE CAPABILITIES

BACKGROUND OF THE INVENTION

1. Field of the Invention

The present invention relates to high-availability computing and more particularly to cluster node configuration in a high-availability computing architecture.

2. Description of the Related Art

Computing clusters have become common in the field of high-availability and high-performance computing. Cluster-based systems exhibit three important and fundamental characteristics or properties: reliability, availability and serviceability. Each of these features is of paramount importance when designing the software and the hardware of a new robust clustered system. As opposed to the symmetric multi-processing (SMP) systems whose scalability can be limited and which can result in substantially diminished returns upon the addition of processors to the system, a clustered-based system consists of multiple computers that are connected over high-speed network communicative linkages.

Each computer in a cluster enjoys its own memory, possibly its own disk space and it hosts its own local operating system. Each node within the cluster system can be viewed as a processor-memory module that cooperates with other nodes such that it can provide system resources and services to user applications. Nodes in a cluster system, however, are not limited to a physical computing system. Rather, nodes in a cluster system also can include virtual machines operating in a physical host environment.

Clusters can be characterized by increased availability since the failure of a particular node does not affect the operation of the remaining nodes. Rather, any one failed node can be isolated and no longer utilized by the cluster-based system until the node can be repaired and incorporated again within the cluster. Additionally, the load of a failed node within a cluster can be equitably shared among the functional nodes of the cluster. Thus, clusters have proven to be a sensible architecture for deploying applications in the distributed environment and clusters are now the platform of choice in scalable, high-performance computing.

Generally, in the middleware environment, cluster membership must be manually managed. Typically, cluster membership management requires doing capacity planning to determine how many cluster members are necessary for a given environment. Subsequently, an installation of a middleware platform on a machine must be provided as a host node for each of the members. Host nodes usually are chosen based upon some sort of criteria specified by the applications to be deployed to the cluster. Examples include dependencies on third party software collocated on the same host node, a requirement for a minimum amount of memory or central processing unit (CPU) power on the host node, and the like.

Occasionally, a cluster may require additional computing capacity. In the event a cluster requires additional computing capacity, an existing node capable of hosting the cluster member must be located or, if one does not exist, an additional host node must be configured and added into the middleware environment. After the node has been located or added, then a new cluster member then must be manually created on a new host node that demonstrates the capabilities required by the applications before the cluster can make use of the additional capacity.

Advanced deployment technologies virtualize the middleware environment, breaking down isolated clusters where normally host nodes were dedicated to a single cluster. Rather, in the virtualized middleware environment, host nodes can be combined into shared resource pools of nodes. For clusters associated with a shared resource pool, however, every node in the pool must include a cluster member created on the node irrespective of the capability and configuration of the node. Thus, manual planning and thought is required to selectively place nodes into resource pools in order to ensure that a cluster does not become associated with a pool that contains nodes incapable of hosting applications to be deployed to the cluster.

BRIEF SUMMARY OF THE INVENTION

Embodiments of the present invention address deficiencies of the art in respect to virtualized middleware environments and provide a novel and non-obvious method, system and computer program product for automated cluster member management based on node capabilities. In one embodiment of the invention, a method for automated cluster member management based on node capabilities can be provided. The method can include defining a membership policy for a cluster, the membership policy specifying a nodal configuration required for a node in a cluster. The method further can include evaluating different nodes in a computing environment against the membership policy for the cluster. Finally, the method can include associating cluster members in the cluster to only those of the nodes having respective configurations meeting the nodal configuration of the membership policy. Likewise, the method can include evaluating nodes already in the cluster, and disassociating cluster members in the cluster from those of the nodes having respective configurations failing to meet the nodal configuration of the membership policy.

In one aspect of the embodiment, defining a membership policy for a cluster can include defining a membership policy for a cluster, the membership policy specifying at least one expression describing a nodal configuration required for a node in a cluster. For instance, the nodal configuration can include a minimum hardware configuration. As another example, the nodal configuration can include a minimum set of supporting software applications. In either case, evaluating nodes in a computing environment against the membership policy can include comparing a configuration of each of the nodes to a required configuration specified in the membership policy.

In another aspect of the embodiment, evaluating nodes against the membership policy can include comparing a cached or non-cached configuration of each of the nodes to a required configuration specified in the membership policy. Finally, in yet another aspect of the embodiment, evaluating nodes against the membership policy, can include evaluating a boolean expression in the membership policy for each of the nodes using parameters for each of the nodes, the parameters corresponding to a configuration of each of the nodes.

In another embodiment of the invention, a virtualized middleware data processing system can be configured for automated cluster member management based on node capabilities. The system can include a middleware environment of nodes communicatively coupled to a cluster management host. The system also can include cluster management logic coupled to the cluster management host. Finally, the system can include a membership policy evaluator coupled to the cluster management host. The evaluator can include program code enabled to compare a configuration of each of the nodes to a membership policy to determine which of the nodes have a configuration sufficient to host cluster members in a cluster in the middleware environment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for automated cluster member management based on node capabilities. In accordance with an embodiment of the present invention, a membership policy can be established describing a node configuration required for a node to host a cluster member. For instance, the node configuration can refer to minimum hardware resources of the node, or a set of supporting software applications resident in the node. Thereafter, nodes can be added and removed from a cluster depending upon whether the nodes comport with the terms of the membership policy. In this way, nodes permitted to host cluster members in a cluster can be limited only to those nodes able to support the processing requirements of the cluster while those nodes unable to support the processing requirements of the cluster can be excluded from the cluster.

Figure 1:
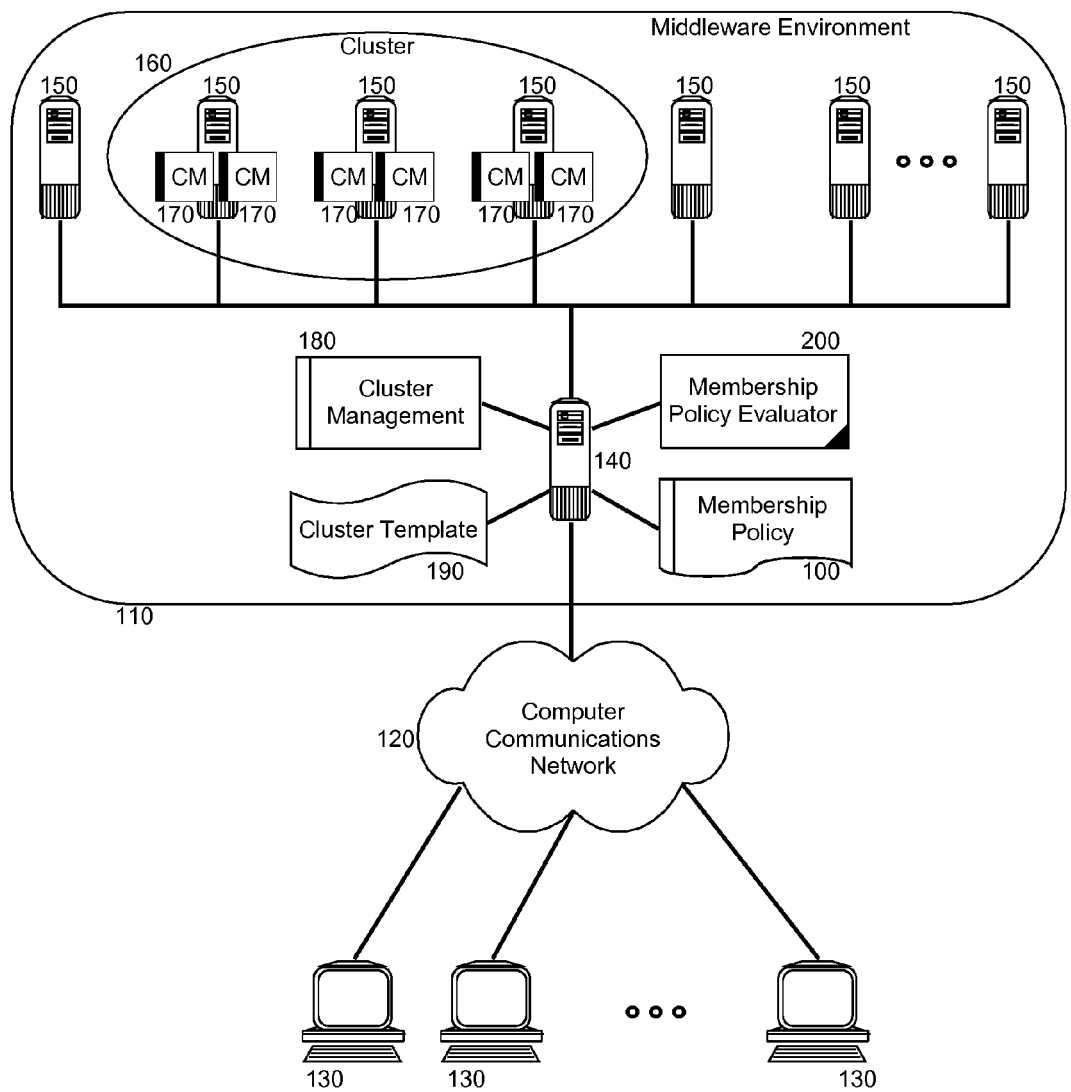
FIG. 1 is a schematic illustration of a virtualized middleware data processing system configured for automated cluster member management based on node capabilities; and, FIG. 2 is a flow chart illustrating a process for automated cluster member management based on node capabilities.

The foregoing automated cluster member management can be performed within a virtualized middleware data processing system. In illustration, FIG. 1 schematically depicts a virtualized middleware data processing system configured for automated cluster member management based on node capabilities. As shown in FIG. 1, a virtualized middleware data processing system can include a middleware environment 110 configured for communicative coupling to one or more client computing end points 130 over computer communications network 120. As it will be recognized by the skilled artisan, middleware refers to software that allows elements of applications to interoperate across network links, despite differences in underlying communications protocols, system architectures, operating systems, databases, and other application services.

The middleware environment 110 can support clustered computing including one or more nodes 150 communicatively linked to a cluster management host 140. To that end, cluster management host 140 can be configured to support the operation of cluster management logic 180. The cluster management logic 180 can include program code enabled to define a cluster 160 amongst the nodes 150 and to assign one or more applications for execution within cluster members 170 in the cluster 160. As is well known in the art, the cluster 160 can be defined according to a cluster template 190.

In accordance with an embodiment of the invention, a membership policy 100 can be defined for the cluster 160. The membership policy 100 can specify a configuration for a node 150 that must be satisfied for the node 150 either to be added to the cluster 160, or to remain a part of the cluster 160 hosting one or more cluster members 170. In one aspect of the embodiment, the membership policy 100 can include one or more expressions to be evaluated such as "NODE_NAME='linux'" or "NODE_PROPERTY$DB2 CLIENTINSTALLED EXISTS". Optionally, boolean expressions relating one or more evaluations in an expression can be supported such as "NODE_NAME='linux' AND NODE_HOSTNAME='primaryhost'".

Membership policy evaluator 200 can be coupled to the cluster management host 140. The membership policy evaluator 200 can include program code enabled to evaluate the expressions in the membership policy 100 in order to determine whether or not a node 150 can be added to host a cluster member, or to remain a host of a cluster member of cluster 160. In this regard, when the cluster 160 is first created, the nodes 150 accessible by the cluster management 180 can be individually evaluated according to the membership policy 100. Those of the nodes 150 satisfying the membership policy 100 can be configured to host cluster members 170 of the cluster 160. Thereafter, as new ones of the nodes 150 are added to the middleware environment 110, the new ones of the nodes 150 can be processed according to the membership policy 100. Likewise, as different ones of the nodes 150 are modified, the modified ones of the nodes 150 can be re-evaluated against the membership policy 100 and non-conforming ones of the nodes 150 can be removed from the cluster 160 or newly conforming ones of the nodes 150 can be added to the cluster 160.

Figure 2:
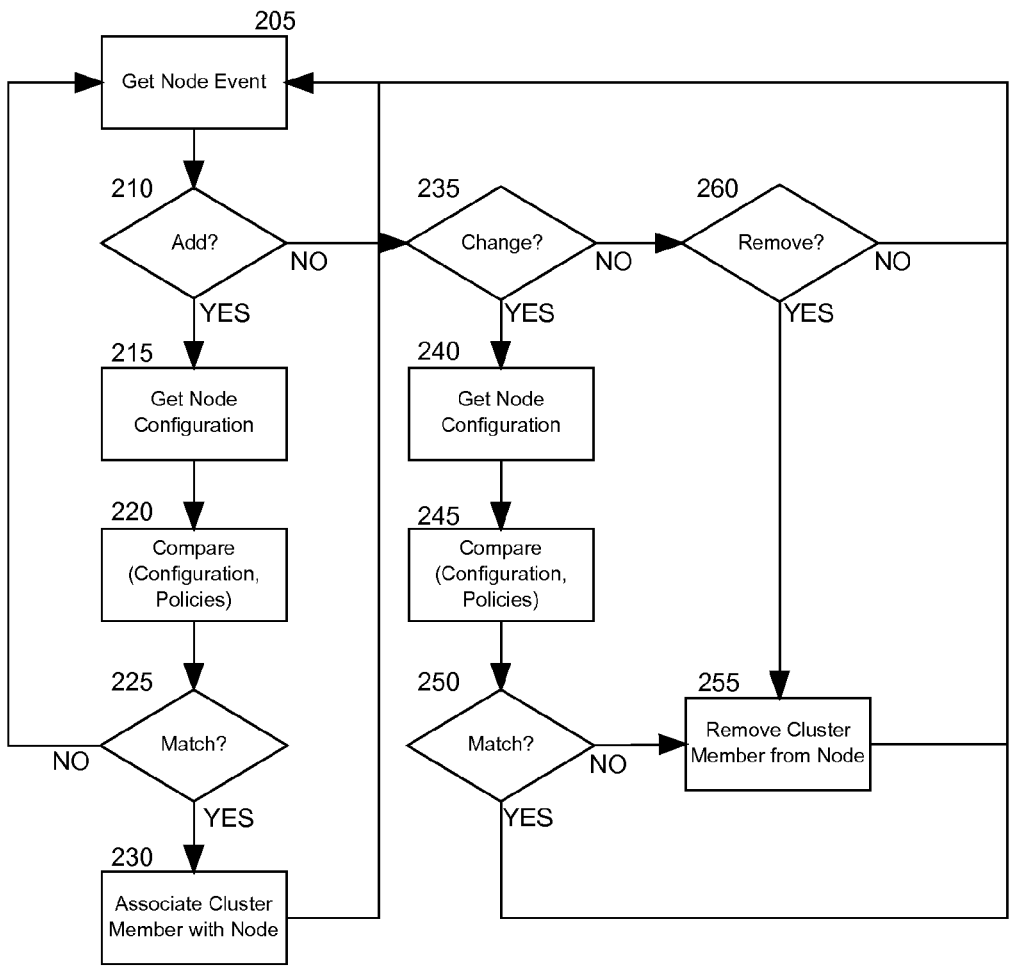

In yet further illustration of the operation of the membership policy evaluator 200, FIG. 2 is a flow chart illustrating a process for automated cluster member management based on node capabilities. Beginning in block 205, a node event can be processed in connection with the cluster. For example, the node event can include a adding a new node to a computing environment hosting the cluster or changing an existing node in the cluster or removing a node from the cluster. In decision block 210, if the event is a newly added node to the cluster, in block 215 the node configuration of the newly added node can be retrieved and in block 220 the configuration can be compared to membership policies for the cluster. In decision block 225, if the newly added node compares favorably with one or more of the membership policies, in block 230 a cluster member in the cluster can be associated with the newly added node and the process can return to block 205.

By comparison, in decision block 235, if the node event is a changed node in the cluster, in block 240 a node configuration can be retrieved for the changed node and in block 245, the configuration can be compared to the membership policies for the cluster. Subsequently, in decision block 250, if the changed node fails to compare favorably with the membership policies, in block 255 the cluster member associated with the changed node can be disassociated from the changed node. Finally, in decision block 260 if the node event is a removed node in the cluster, as before in block 255 the cluster member associated with the changed node can be disassociated from the changed node. Optionally, in the case both of determining whether or not to add a new node to the cluster and also determining whether or not to remove a changed node in the cluster, the configuration of the nodes can be evaluated from a cached image of the node configuration in order to preserve performance in the computing environment.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for automated cluster member management based on node capabilities, the method comprising:
   retrieving, from a data storage device, a membership policy for a cluster, the membership policy specifying a nodal configuration required for a node in the cluster;
   evaluating nodes in a computing environment against the membership policy for the cluster; and
   associating cluster members in the cluster only to those of the nodes having respective configurations meeting the nodal configuration of the membership policy, wherein
   the evaluating comprises comparing a cached configuration of each of the nodes in the computing environment to a required configuration specified in the membership policy.

2. The method of claim 1, further comprising:
   evaluating a plurality of nodes already in the cluster; and
   disassociating cluster members in the cluster from those of the plurality of nodes already in the cluster having respective configurations failing to meet the nodal configuration of the membership policy.

3. The method of claim 1, wherein the membership policy specifies at least one expression that describes the describing a nodal configuration required for the node in the cluster.

4. The method of claim 3, wherein the nodal configuration comprises a minimum hardware configuration.

5. The method of claim 3, wherein the nodal configuration comprises a minimum set of supporting software applications.

6. The method of claim 3, wherein
   the evaluating comprises evaluating a Boolean expression in the membership policy for each of the nodes using parameters for each of the nodes, and
   the parameters corresponding to a configuration of each of the nodes.

7. A virtualized middleware data processing hardware system configured for automated cluster member management based on node capabilities, comprising:
   a middleware environment comprising nodes communicatively coupled to a cluster management host;
   cluster management logic coupled to the cluster management host; and
   a membership policy processor coupled to the cluster management host, the processor configured to
      compare a cached configuration of each of the nodes to a required configured specified in a membership policy, and
      determine, based upon the comparison, which of the nodes have a configuration sufficient to host cluster members in a cluster in the middleware environment.

8. The system of claim 7, wherein
   the cluster comprises a plurality of cluster members executing on a plurality of the nodes selected to be included in the cluster.

9. The system of claim 7, further comprising
   a cluster template from which the cluster is created.

10. The system of claim 7, wherein
    the membership policy comprises a Boolean expression of configuration parameters for the nodes.

11. A computer program product comprising a non-transitory computer usable storage medium having stored therein computer usable program code for automated cluster member management based on node capabilities, the computer usable program code, which when executed by a computer hardware system, causes the computer hardware system to perform
    retrieving a membership policy for a cluster, the membership policy specifying a nodal configuration required for a node in the cluster;
    evaluating nodes in a computing environment against the membership policy for the cluster; and
    associating cluster members in the cluster only to those of the nodes having respective configurations meeting the nodal configuration of the membership policy, wherein
    the evaluating comprises comparing a cached configuration of each of the nodes in the computing environment to a required configuration specified in the membership policy.

12. The computer program product of claim 11, wherein the computer hardware system is further configured to perform:
    evaluating a plurality of nodes already in the cluster; and
    disassociating cluster members in the cluster from those of the plurality of nodes already in the cluster having respective configurations failing to meet the nodal configuration of the membership policy.

13. The computer program product of claim 11, wherein the membership policy specifies at least one expression that describes the nodal configuration required for the node in the cluster.

14. The computer program product of claim 13, wherein the nodal configuration comprises a minimum hardware configuration.

15. The computer program product of claim 13, wherein the nodal configuration comprises a minimum set of supporting software applications.

16. The computer program product of claim 13, wherein the evaluating comprises evaluating a Boolean expression in the membership policy for each of the nodes using parameters for each of the nodes, and the parameters corresponding to a configuration of each of the nodes.

* * * * *